(12) United States Patent
Derouault et al.

(10) Patent No.: US 6,733,272 B1
(45) Date of Patent: May 11, 2004

(54) MOLDING UNIT COMPRISING IMPROVED COMPENSATING MEANS AND EXTRUSION-BLOW MOLDING MACHINE EQUIPPED THEREWITH

(75) Inventors: Philippe Derouault, Octeville-sur-Mer (FR); Eric Lemaistre, Octeville-sur-Mer (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 09/914,649

(22) PCT Filed: Feb. 24, 2000

(86) PCT No.: PCT/FR00/00467
§ 371 (c)(1),
(2), (4) Date: Jan. 10, 2002

(87) PCT Pub. No.: WO00/53395
PCT Pub. Date: Sep. 14, 2000

(30) Foreign Application Priority Data

Mar. 8, 1999 (FR) .............................. 99 02929

(51) Int. Cl.⁷ ..................... B29C 49/48; B29C 49/56
(52) U.S. Cl. ................. 425/531; 425/405.1; 425/451.7; 425/541
(58) Field of Search .............. 425/541, 451.7, 425/403.1, 389, 531

(56) References Cited

U.S. PATENT DOCUMENTS

| 3,829,264 | A | * | 8/1974 | Mnilk et al. | ............... 425/149 |
|---|---|---|---|---|---|
| 3,833,333 | A | * | 9/1974 | Britten | ......................... 425/406 |
| 4,427,360 | A | * | 1/1984 | Albrecht et al. | ............. 425/541 |
| 4,762,486 | A | * | 8/1988 | Windstrup et al. | ........... 425/541 |
| 5,411,391 | A | * | 5/1995 | Albrecht et al. | .......... 425/451.9 |
| 5,486,103 | A | * | 1/1996 | Meiring et al. | .............. 425/541 |
| 5,700,496 | A | * | 12/1997 | Bacon | ......................... 425/193 |
| 5,730,927 | A | * | 3/1998 | Rader et al. | .................. 264/523 |
| 6,099,286 | A | * | 8/2000 | Nitsche | ........................ 425/168 |
| 6,444,160 | B1 | * | 9/2002 | Bartoli | ......................... 264/545 |

FOREIGN PATENT DOCUMENTS

| FR | 2659265 A1 | * | 9/1991 | ........... B29C/49/56 |
|---|---|---|---|---|
| WO | WO 9813191 A1 | * | 4/1998 | ........... B29C/49/56 |

* cited by examiner

*Primary Examiner*—Robert B. Davis
(74) *Attorney, Agent, or Firm*—Sughrue Mion, PLLC

(57) ABSTRACT

The invention proposes a molding unit comprising a mold in two parts, each mold-half (12) being borne by a support (17), of the type in which the two supports can be moved between an open position and a closed position, in which the supports are connected to each other by locking means, and of the type in which the molding unit comprises fluid pressure compensating means that push transversely at least one of the mold-halves (12) toward the other, characterized in that the fluid pressure compensating means are realized in the form of an inflatable flexible cushion (30) interposed between one rear face of the mold-half (12) and one front face of the associated support (17).

15 Claims, 2 Drawing Sheets

MOLDING UNIT COMPRISING IMPROVED COMPENSATING MEANS AND EXTRUSION-BLOW MOLDING MACHINE EQUIPPED THEREWITH

The present invention relates to the field of extrusion-blow molding machines for articles made of thermoplastic material, particularly for the production of containers such as bottles, flasks or water bottles.

Such a machine essentially comprises an extrusion head that produces at least one tubular plastic parison, at least one molding unit comprising a mold in two parts, the two parts of the mold being positioned so as to close over the parison that is still soft from the extrusion head, and a blow-forming station that is provided with means for Injecting air under pressure inside the parison enclosed in the mold. The air under pressure allows the parison to be deformed so that it fits the form of the mold cavity.

In some cases, the machine also comprises a degating station that allows the excess material to be cut off.

More particularly, the invention relates to a molding unit for such a machine. This molding unit comprises a mold in two parts In which each mold-half is borne by a movable support. The two movable supports are moved relative to each other along a path that is substantially transversal to the plane of the joint of the mold. In an open position, the two mold-halves are transversely separated from each other to allow a blank of the article, that is, a parison, to be inserted in a cavity delimited between the two-mold-halves. In a dosed position, the two mold-halves are pressed against each other by their front faces, and the supports are connected to each other by locking means.

The two supports can be movable in transverse displacement, but they can also be moved In rotation, for example, around a common axis parallel to the plane of the joint of the two mold-halves.

Of course, the molding unit has a mechanism for simultaneously moving both mold supports. This mechanism is adapted to the relative path of the two supports between their open and closed positions. In extrusion-blow molding machines, it is often provided that the molding unit comprises, between at least one of the mold-halves and the associated support, fluid pressure compensating means that push this mold-half transversely toward the other mold-half.

These compensating means make it possible to prevent the two mold-halves from separating from each other under the effect of the blow pressure. They also enable the front faces of the two mold-halves to be securely closed against each other In spite of the presence of the excess material caught between the two mold-halves at the use of closure. In some cases, the forces required to "smash" and pre-cut this excess material is quite large. They also depend on the quantity of material caught between the two molds.

An extrusion blow-molding machine incorporating these characteristics is described, for example, in the document U.S. Pat. No. 5,730,927.

In this document, it can be seen that the compensating means are in the form of hydraulic actuators, the machine being, in this instance, equipped with compensating means at both supports. One disadvantage of the actuator is that it only exerts a localized action on the mold-half. Such being the case, given the compensating forces applied, a localized action can only result In causing at least a local deformation of the mold-half. Also, in order to obtain a a certain distribution of the compensating force, six actuators are provided between each support and the associated mold-half, which make it possible to limit the deformations of the mold-half.

However, the actions of the actuators are still no less localized, and the mold-half must therefore have a relatively high rigidity in order for the force of the mold-half against the other mold-half to be close to homogeneous over the entire surface of the joint plane between the two mold-halves.

Moreover, this large number of actuators is a disadvantage in terms of set-up costs.

A more particular object of the Invention, therefore, is to propose a new design of compensation means that make it possible to obtain, with a simple, low-cost device, a very good distribution of the compensation forces over the entire surface of the mold.

To that end, the invention proposes a molding unit of the type described above, characterized in that the fluid pressure compensating means are accomplished in the form of an inflatable flexible cushion Interposed between a rear face of the mold-half in question and a front face of the associated support.

According to other characteristics of the invention:

in transverse projection the cushion extends in such a way as substantially to cover the entire surface of the transverse projection of the mold-half;

when the supports are in the closed position, the molding unit is ready for the blow-molding, and the inflatable cushion controls the movement of the mold-half from its retracted position to its advanced position after the two supports are locked in dosed position;

the mold-halves are furnished with precut means which, when the mold-half is in the advanced position, perform a pre-cut of the parison depending on the contour of the article to be formed;

the mold-half comprises controlled means for returning the mold-half to its retracted position;

the return means comprise an auxiliary inflatable flexible cushion; and the return means comprise a bracket, which is placed at the outer side of the support and which bears, at its two opposite ends, connecting pins that extend through oblong apertures made in the lateral faces of the support in order to be connected to the mold-half, and the auxiliary cushion Is interposed between the bracket and a rear face of the support.

The invention also proposes an extrusion-blow molding machine, characterized in that it comprises at least one molding unit incorporating any of the preceding characteristics.

Other characteristics and advantages of the invention will become apparent in the detailed description that follows, as well as in the appended drawings In which.

Figure 1:
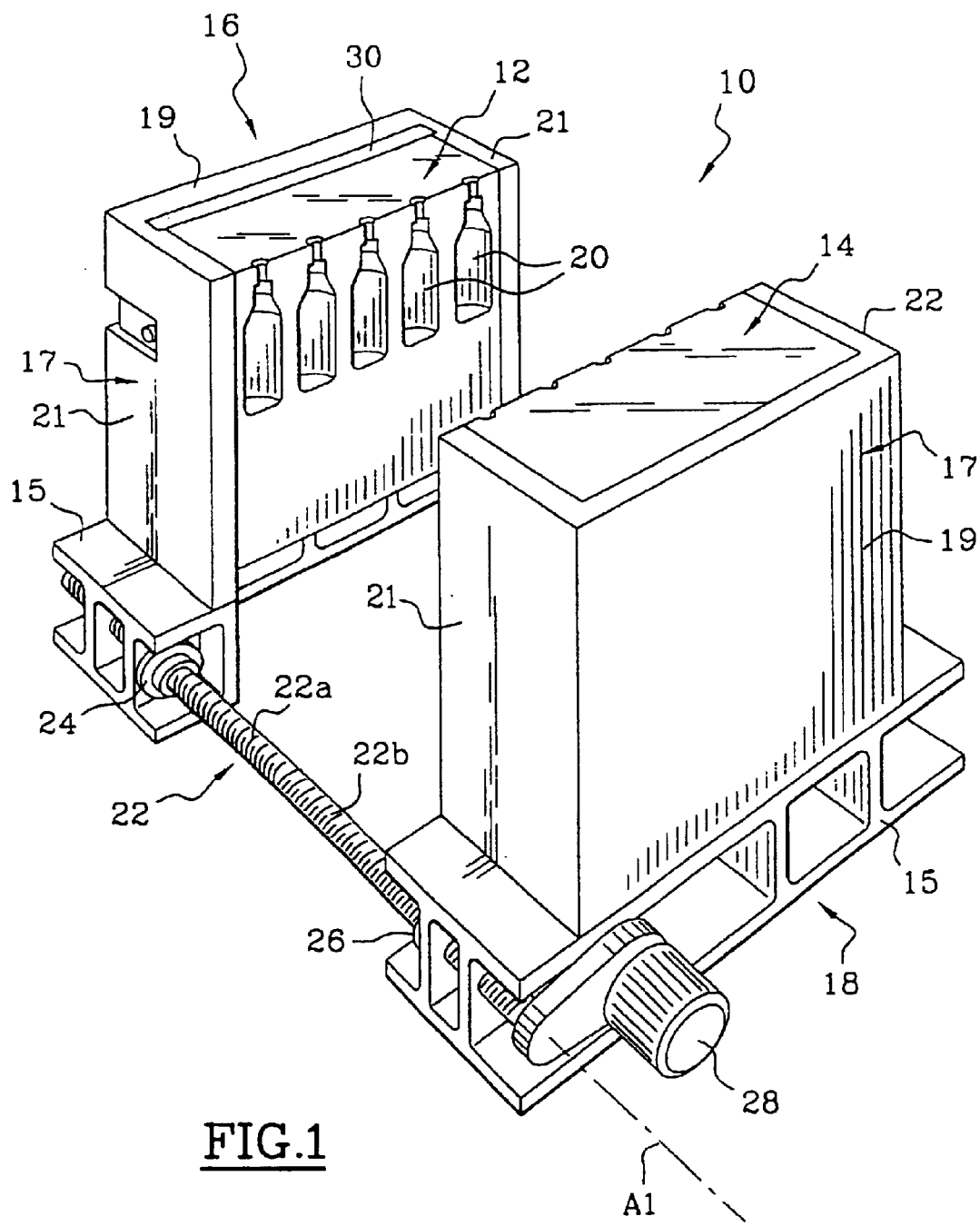
FIG. 1 is a diagrammatic view in perspective illustrating a molding unit In accordance with the methods of the invention.

FIG. 1 diagrammatically illustrates a molding unit 10 for an extrusion-blow molding machine. The unit 10 comprises essentially two mold-halves 12, 14, each of which is borne by a support 16, 18. The two supports are movable along a transversal axis perpendicular to the plane of the joint of the two mold-halves 12, 14, between a dosed position and an open position illustrated in FIG. 1. In the present instance, the supports 16, 18 are slideably mounted on rails (not shown). The two supports 16, 18 each comprise a base 15, on which is mounted a mold clamping unit 17, which has a rear plate 19 and two side flanges 21. The rear plate 19 and the two flanges 21 thus delimit a space open toward the front in which the associated mold-half is received.

The two front faces facing the two mold-halves 12, 14 have one or more cavity-halves 20 which, when the mold is closed, define one or more cavities In the shape of the article to be formed. In the text, the ideas of front and back refer to the mold-half concerned.

In order to control the relative movements of the two supports 16, 18, the unit 10 comprises a screw/nut type mechanism having a screw 22 with transverse axis A1 and two ball-race nuts 24 one of which Is integral with a first support 16 and the other 26 with the second support 18. The screw 22 Is transversely fixed with respect to a frame that holds the molding unit 10, and R comprises two threaded sections 22a and 22b, which present thread pitches for which the directions of turn are opposite to each other. The nut 24 of the first support cooperates with the first 22a of the sections while the nut 26 of the second support cooperates with the other, section 22b. In this way, when the screw 22 is driven in rotation around its axis A1 by a motor 28, the two supports 16, 18 are simultaneously controlled In transverse displacement in opposite directions. If the value of the pitch of the two threaded sections is the same, the two supports 16, 18 are moved over an equal distance.

This mechanism is particularly advantageous because it has a small number of parts, while still ensuring great precision and perfect reproducibility of the simultaneous movements of the two supports. Moreover, the use of ball-race nuts makes it possible on the one hand to obtain good energy efficiency, and on the other hand, to obtain movements with high speeds and strong accelerations.

The molding unit 10 is therefore intended to be placed in mold-open position beneath an extrusion unit having as many extrusion dies as the mold has cavities. When the parison extruded by each head has reached the desired length, the mold is shut to enclose, in each cavity, a parison section. The mold is then closed by the screw/nuts mechanism and the two supports are secured to each other by locking means (not represented), placed for example at the front edges of the flanges 21. Next, the molding unit Is intended to cooperate with a blow-molding station to inject a fluid under pressure Into the parisons enclosed in each cavity in order to mold the parison to the shape of the cavity.

To compensate for the tendency of the mold-halves to separate under the action of the blow-molding fluid and to place them efficiently against each other, the blow-molding unit according to the Invention comprises fluid pressure compensating means that are interposed transversally between the support and the associated mold-half to push the mold-half in question back in the direction of the other mold-half. Of course, the mold-half is then movably mounted slideably in the transverse direction with respect to the associated support between the retracted position illustrated in FIG. 4 and an advanced position Illustrated in FIG. 3. In practice, a maximum transverse travel of about one centimeter is provided for the mold-half 12 with respect to the support 16.

In the proposed exemplary embodiment, compensating means are provided only between the first support 16 and the associated mold-half 12. The second mold-half 14 is rigidly fixed to the second support 18.

According to a first aspect of the invention, the compensating means are formed from an inflatable flexible cushion 30, which is placed between the rear plate 19 of the support 16 and a rear face of the mold-half 12. The cushion 30 therefore has a substantially rectangular shape and a relatively small transverse thickness compared to its other dimensions, although it has two principal faces, front and back, that press against the rear plate of the support 16 and on the rear face of the mold-half 12, respectively. When it Is Inflated, the cushion 30 is deformed, essentially at its front and back faces, such that its transverse thickness tends to Increase while pushing the mold-half 12 forward.

It will be noted that the cushion 30 has a surface area that is substantially equal to, or even greater than, that of the mold-half. In effect, it can be seen that the cushion projects slightly past the rear face of the mold-half, at least on three sides. Thus, by inflating the cushion 30 with a fluid at a pressure substantially equal to or greater than that of the blow molding fluid, the resulting action of these two fluids on the mold-half is an action that pushes toward the other mold-half 14.

Of course, preferably the same source of fluid Is used for blow-molding the articles and for inflating the cushion 30. However, the blow-molding pressure can be less than the pressure injected into the cushion 30.

The cushion 30 is preferably inflated before proceeding with the blow molding. However, in certain cases the cushion will be inflated at the same time as the blow molding is carried out.

In the extrusion-blow molding process, pressures on the order of 10 bars are generally used. Also, when the mold has a large cavity or several cavities, the forces exerted by the fluid pressures can be quite large. However, the use of a flexible cushion makes it possible to ensure that the compensating pressure is distributed uniformly over the entire rear face of the mold-half. In this way, the force of the first mold-half 12 applied against the second 14 is uniformly distributed over the entire joint plane of the mold, without the need to use particularly rigid mold-halves or mold clamping units, which allows costs to be decreased.

The use of a lighter mold makes it possible to reduce the inertia of the moving parts of the molding unit, which therefore makes it particularly suited to fast paced machines in which it is necessary to minimize the mold opening and closing times by movements that are fast with high acceleration.

In order to ensure perfect equilibrium of the compensating action, particularly when inflation begins, the cushion 30 is provided with two longitudinally separated intakes 32 which are fed by the same system. Thus any possibility is avoided of lateral imbalance of the action of the compensating means, and thus any risk of binding. The intakes 32 preferably emerge from the rear of the support 16, through the rear plate 19, and they are placed substantially at mid-height of the cushion 30.

Having pressure uniformly distributed over the entire mold also greatly improves the quality of the precutting of the flashes. Indeed, most molds have, around the cavity-halves 20 of each mold-half 12, 14, precutting areas (not represented) whose purpose Is to facilitate deflashing, which is done later at a degating unit. These areas, also called cutting knives, perform a pre-cut of the excess material that encloses the finished article or articles, and they are formed from elements in relief on the inside face of one of the mold-halves that cooperate with the complementary elements of the other mold-half.

Therefore, due to the very good distribution of the contact pressure at the joint plane, a very uniform, regular precutting is obtained along the entire contour of the article or articles.

Compared to known compensating systems, it can therefore be avoided that in certain places, the precutting is not actually a complete cut, with the risk of dropping remaining material into the mold, while in other places the precut would be insufficient.

Thus, with a molding unit according to the Invention, the closing of the mold can be broken down into three successive steps, In which three different devices are Involved. First, the movement of the mold supports is provided by the drive screw 22. Next, the locking means (not represented) secure the two supports 16, 18 to each other. Finally, the compensating cushion 30 pushes the two mold-halves 12, 14 against each other with a force such that it makes it possible to prevent the separation of the two mold-halves 12, 14 during the subsequent mold blowing operation.

Figure 2:
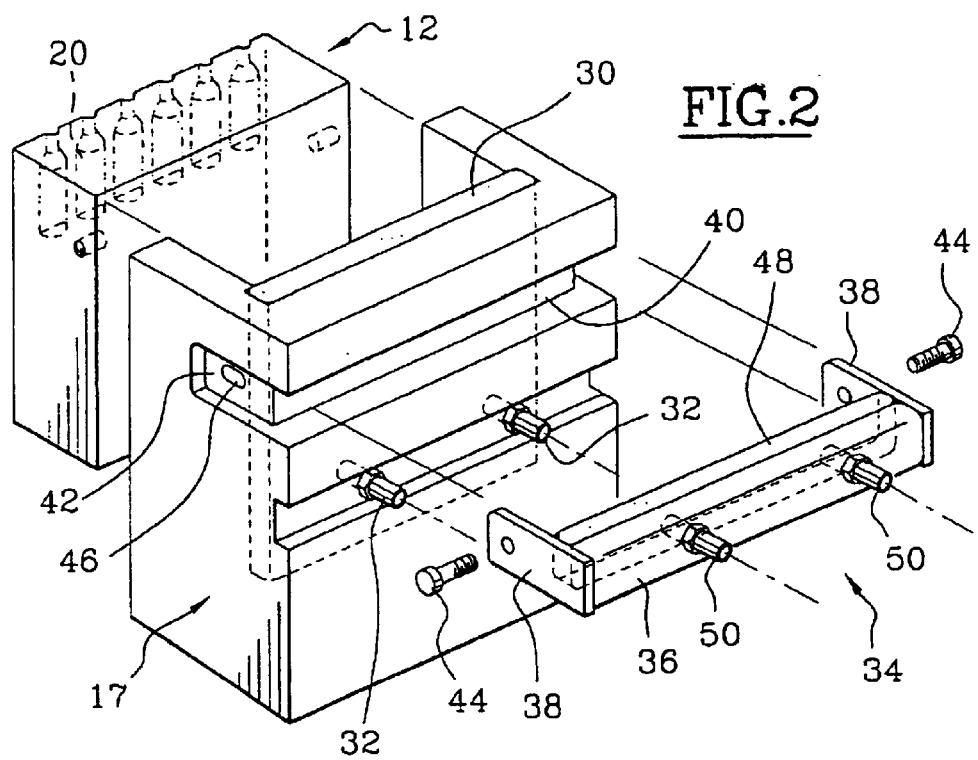
FIG. 2 is an exploded view in perspective, viewed at an angle, of the part of the molding unit that holds the compensating means.

According to another aspect of the invention, it is provided with controlled means to pull back the mold-half to its retracted position, these means being particularly noticeable in FIG. 2.

The molding unit thus comprises a pullback bracket 34 essentially having a longitudinal bar 36, each end of which is fitted with a transverse arm 38 which extends transversally forward. The longitudinal bar 36 Is received in a groove 40 made in the rear face of the mold clamping unit 17 while the arms 38 are received in grooves 42 made In the flanges 21. At their free front end, the arms 38 each have a connecting pin 44 which extends through a transverse hole 46 made in the corresponding flange 21. The pins 44 are each attached on one side of the mold-half so that the mold-half 12 and the bracket 34 are integral with each other during movement, in a transverse direction. In the proposed example, the connecting pins 44 are made in the form of screws intended to be screwed directly into the mold-half 12.

The transverse length of the holes 46 corresponds to the maximum travel of the mold-half between its retracted and advanced positions, so that the ends of the holes form safety stops for the connecting pins 44, and therefore for the mold-half 12.

Thus, the bracket follows the transverse movements of the mold-half 12. According to the invention, therefore, an auxiliary inflatable cushion 48 has been provided, which is interposed between the bar 36 and the bottom of the groove 40 in which the bar 36 is received. When the auxiliary flexible cushion 48 is not inflated, the main cushion 30 can move the mold-half 12 toward its principal advanced position 30, as illustrated in FIG. 3.

Figures 3, 4:
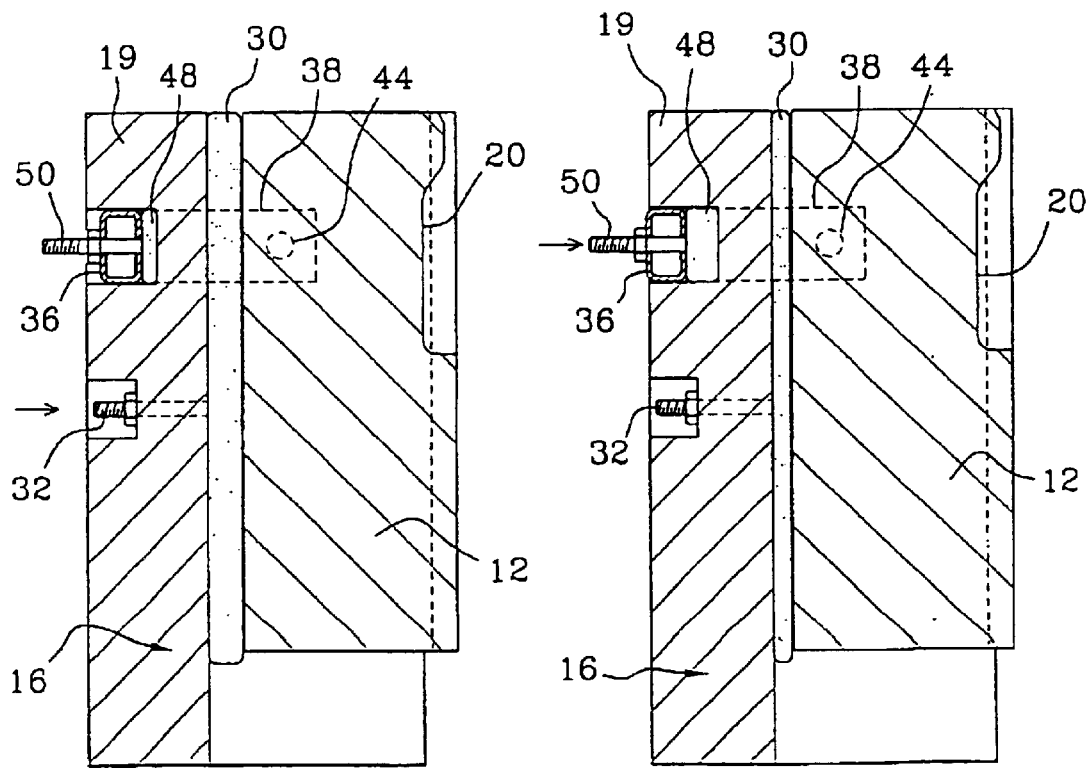
FIGS. 3 and 4 are cross sectional views along a transverse plane illustrating the two positions, advanced and retracted, of the mold-half.

However, when fluid under pressure is no longer fed to the principal cushion 30, the auxiliary cushion 48 can then be fed with fluid under pressure, as illustrated in FIG. 4. This cushion, when inflating, pushes the bar 36 backward so that the bracket 34 brings the mold-half 12 back to its retracted position, by means of the connecting pins 44.

It is particularly advantageous to use controlled pull-back means, rather than using, as has been known up until now, spring-type elastic pull-back means. Indeed, when springs are used to bring back the mold-half 12 to its retracted position, the compensating means, regardless of their nature, must work against the resisting force imposed by the springs in order to move the mold-half to its advanced position. This inevitably leads to oversizing the compensating means.

The controlled pullback means according to the invention can be realized in any way other than the one described above. For example, they can be realized in the form of hydraulic or electrical actuators or in the form of electromagnets.

However, when the compensating means are realized in the form of an inflatable cushion, it is advisable to use controlled pull-back means using the same type of energy source, which in this instance is a fluid under pressure. Also, the use of a cushion makes it possible to ensure a perfectly symmetrical pull-back force in order to prevent any binding of the mold-half 12 with respect to the support 16, particularly by providing, as in the case of the principal cushion 30, two inlets 50, which are longitudinally separated and which emerge toward the rear of the bar 36 of the bracket 34.

What is claimed is:

1. A molding unit for an extrusion-blow molding machine for articles made of thermoplastic material, of the type in which the molding unit (10) comprises a mold in two parts, each mold-half (12, 14) being borne by a support (16, 18), of the type in which the two supports (16, 18) can be moved relative to each other between an open position in which the two mold-halves (12, 14) are transversely separated from each other to allow the insertion of a parison in a cavity (20) delimited between the two mold-halves (12, 14), and a closed position in which the front faces of the two mold-halves (12, 14) are pressed against each other, and in which the supports (16, 18) are connected to each other by locking means, and of the type in which the molding unit (10) comprises, between at least one of the mold-halves (12) and the associated support (16), fluid pressure compensating means that push the mold-half (12) transversely from a retracted position to an advanced position, toward the other mold-half (14), characterized in that the mold-half (12) has controlled pull-back means (48) for pulling back the mold-half (12) to its retracted position.

2. The molding unit according to claim 1, characterized in that the pull-back means comprise an auxiliary inflatable flexible cushion (48).

3. The molding unit according to claim 2, characterized in that the pull-back means comprise a bracket (34) that is placed on the outer side of the support (16) and which has, at its two opposite ends, connecting pins (44) that extend through oblong holes (46) made in the side faces (21) of the support to connect to the mold-half (12), and in that the auxiliary cushion (48) is interposed between the bracket (34) and a rear face of the support (16).

4. The molding unit according to claim 3, characterized in that the fluid pressure compensating means are realized in the form of an inflatable flexible cushion (30) interposed between one rear face of the mold-half (12) and one front face of the associated support (16).

5. The molding unit according to claim 4, characterized in that, in transverse projection, the cushion (30) extends in such a way as to cover substantially the entire surface of the transverse projection of the mold-half (12).

6. The molding unit according to claim 5, characterized in that, when the supports (16, 18) are in the closed position, the molding unit (10) is ready for the blow-molding, and in that the inflatable cushion (30) controls the movement of the mold-half (12) from its retracted position to its advanced position after the two supports (16, 18) are locked in the closed position.

7. The molding unit according to claim 1, characterized in that, the mold-halves (12, 14) are furnished with pre-cut means which, when the mold-half (12) is in the advanced position, perform a pre-cut of the parison depending on the contour of the article to be formed.

8. An extrusion-blow forming machine, characterized in that it comprises at least one molding unit (10) in accordance with claim 1.

9. The molding unit according to claim 1, characterized in that the fluid pressure compensating means are realized in the form of an inflatable flexible cushion (30) interposed between one rear face of the mold-half (12) and one front face of the associated support (16).

10. The molding unit according to claim 1, characterized in that:

the pull-back means comprise an auxiliary inflatable flexible cushion (48); and the fluid pressure compensating means are realized in the form of an inflatable flexible cushion (30) interposed between one rear face of the mold-half (12) and one front face of the associated support (16).

11. The molding unit according to claim 1, characterized in that:

the fluid pressure compensating means are realized in the form of an inflatable flexible cushion (30) interposed between one rear face of the mold-half (12) and one front face of the associated support (16); and in transverse projection, the cushion (30) extends in such a way as to cover substantially the entire surface of the transverse projection of the mold-half (12).

12. The molding unit according to claim 1, characterized in that:

the fluid pressure compensating means are realized in the form of an inflatable flexible cushion (30) interposed between one rear face of the mold-half (12) and one front face of the associated support (16); and when the supports (16, 18) are in the closed position, the molding unit (10) is ready for the blow-molding, and in that the inflatable cushion (30) controls the movement of the mold-half (12) from its retracted position to its advanced position after the two supports (16, 18) are locked in the closed position.

13. The molding unit according to claim 1, characterized in that:

the pull-back means comprise an auxiliary inflatable flexible cushion (48);

the fluid pressure compensating means are realized in the form of an inflatable flexible cushion (30) interposed between one rear face of the mold-half (12) and one front face of the associated support (16); and in transverse projection, the cushion (30) extends in such a way as to cover substantially the entire surface of the transverse projection of the mold-half (12).

14. The molding unit according to claim 1, characterized in that:

the pull-back means comprise an auxiliary inflatable flexible cushion (48);

the fluid pressure compensating means are realized in the form of an inflatable flexible cushion (30) interposed between one rear face of the mold-half (12) and one front face of the associated support (16); and when the supports (16, 18) are in the closed position, the molding unit (10) is ready for the blow-molding, and in that the inflatable cushion (30) controls the movement of the mold-half (12) from its retracted position to its advanced position after the two supports (16, 18) are locked in the closed position.

15. The molding unit according to claim 1, characterized in that:

the pull-back means comprise an auxiliary inflatable flexible cushion (48);

the pull-back means comprise a bracket (34) that is placed on the outer side of the support (16) and which has, at its two opposite ends, connecting pins (44) that extend through oblong holes (46) made in the side faces (21) of the support to connect to the mold-half (12), and in that the auxiliary cushion (48) is interposed between the bracket (34) and a rear face of the support (16);

the fluid pressure compensating means are realized in the form of an inflatable flexible cushion (30) interposed between one rear face of the mold-half (12) and one front face of the associated support (16); and when the supports (16, 18) are in the closed position, the molding unit (10) is ready for the blow-molding, and in that the inflatable cushion (30) controls the movement of the mold-half (12) from its retracted position to its advanced position after the two supports (16, 18) are locked in the closed position.

\* \* \* \* \*